Patented Aug. 3, 1943

2,326,000

UNITED STATES PATENT OFFICE 2,326,000

BEARING MATERIAL

Charles P. Teeple, Wilmette, Ill., assignor to Crane Packing Company, Chicago, Ill., a corporation of Illinois No Drawing. Application April 27, 1942, Serial No. 440,661

5 Claims. (Cl. 260—38)

This invention relates in general to a composition material adapted to be used for sealing discs, bearings, and the like, together with the method of making articles of this material in various forms and structures. The invention will be more particularly described as an anti-frictional disc of the type commonly used in water pump seals for internal combustion engines, although the material, because of its nature and characteristics, is well adapted to be used for other low frictional purposes such as shaft bearings, and contact members for rotary or reciprocating engagement.

In the pump and shaft sealing art, it is customary to provide an anti-frictional ring surrounding a shaft making a water-tight engagement with an abutment surrounding the shaft. This ring or disc is commonly made of condensite products such as Bakelite, carbon, fabric impregnated with varnish (Micarta), and other similar materials. These are objectionable because some of them are very brittle and break easily, they wear too rapidly, have a high frictional coefficient, and if it is necessary to stamp or machine them, there is considerable loss of material requiring the time of labor in making them, and they thus become too expensive.

The present invention relates to a composition of material for making a washer, ring, disc, or bearing of this type which may be molded and made of certain ingredients, even including metal, in powdered form so that the resultant member is not easily broken. It has low frictional resistance; there is no waste of material in making it; the labor cost is low; and by incorporating a certain amount of graphite in the mixture, it is practically self-lubricating.

An important object of the invention is to provide a composition of material adapted to be used for anti-frictional discs, bearings, and the like, which can be molded into a fixed or rigid form to contain a lubricating material such as graphite.

A further object of the invention is in the method of combining certain ingredients under a predetermined heat and pressure to form an antifriction disc or bearing of the desired shape and structure without loss of material or high cost of labor in making it.

If a material such as carbon is used, the resultant washer or disc not only breaks easily, but also it tends to charter or vibrate if not lubricated, and requires frequent attention and lubrication. The latter is also true of fabric-reinforced Bakelite compositions. If washers are made of layers of fibrous material such as canvas or cotton bonded together with a varnish of Bakelite, or other material, they must be punched or stamped out of sheets with a resultant loss of material as waste, and are subject to an increased cost for labor in forming them. If made of fiber, or other similar material, they must be cut and formed in a similar manner.

The present invention overcomes these objections by blending powdered metallic and binding materials together to form a material which flows under heat and pressure and combines the ingredients to produce the lowest friction, to provide higher and better wearing properties, and to produce a material which is not fragile or easily deformed under ordinary conditions, but has a low coefficient of friction.

In carrying out this invention, a number of ingredients such as asbestos, lead, antimony, and graphite are blended and mixed with a powdered thermosetting, potentially reactive synthetic resin, such as a condensation product of one or more hydroxy-benzenes and aldehyde, of the phenolformaldehyde type as exemplified by the product commonly known as Bakelite. Although I shall for purpose of brevity refer to this type of resin as "Bakelite," it is to be understood that I do not wish to limit myself to a specific resin commonly sold under this trade-name, but use this term in a generic sense to refer to the class of resins above described. As the service may require other metals such as, for example, copper or bronze may be substituted for the lead and antimony. The mixed ingredients are heated for a short time at a predetermined temperature in a mold under a comparatively high pressure so that the ingredients will flow and assume any desired shape within the mold.

A measured quantity of the mixed ingredients may first be subjected to pressure only, causing the ingredients to adhere in a ring or block for convenience in handling which may thereafter be subjected both to heat and pressure causing the material to flow, assume, and set in a predetermined regular shape or form. In this manner, there is no waste, the mixed ingredients are ready for use, and the formed pieces may be produced as desired. One example of a suitable composition comprises an intimate mixture of:

|  | Per cent |
|---|---|
| Short fiberized asbestos and powdered resin, about 50% of each | 45.4 |
| Powdered lead | 27.3 |
| Powdered antimony | 9.1 |
| Natural flake (micronized) graphite | 18.2 |
|  | 100 |

In producing this mixture, all ingredients, with the exception of the asbestos, are preferably powdered or pulverized so that approximately half of the content will pass through a 325 mesh screen, and all of the powdered ingredients will pass through a 150 mesh screen. The ingredients are intimately mixed together in any suitable manner, as for example, in a ball mill and require no liquid or other binder.

To form measured blocks or pieces of the material without heat, a relatively high pressure is required, and it is found that with a pressure of approximately six tons to the square inch, the mixed ingredients will adhere sufficiently to prepare a preformed piece or slug, but it possesses insufficient strength or other desirable qualities for the finished article.

In order to accurately form bearings, discs, or other pieces, the mixed ingredients or the preformed measured pieces are heated for about three minutes at a temperature of approximately 330° F. in a mold where a pressure of about 4,000 pounds per square inch is applied. Under this heat and pressure, the ingredients will readily flow to form recesses and projections such as may be required, for example in a sealing disc for a pump, or for other purposes as required. Instead of being molded in a single disc, a number of such discs may be molded together in a block or cylinder and then sawed or otherwise cut apart as desired.

In a mixture of powdered copper, where the antimony and lead is omitted, a similar mixture of the following ingredients is also found effective:

|  | Per cent |
|---|---|
| Bakelite, resin and fiber | 30.3 |
| Powdered copper | 60.6 |
| Graphite | 9.1 |
|  | 100 |

Another formula for bearings and similar uses comprises 40% of the synthetic resin and asbestos moulding powder, 20% graphite, and 40% of either powdered copper or lead, depending upon the use desired. For a non-metallic composition, 85% of the moulding powder may be combined with 15% of graphite, and subjected to heat and pressure, as set forth.

In testing and comparing this and other types of friction discs, the following results were observed:

| | |
|---|---|
| Carbon type discs (coefficient of friction) | .0754 |
| Varnish impregnated fabric type (coefficient of friction) | .0515 |
| Above lead-antimony type (coefficient of friction) | .0157 |

The present composition is therefore particularly well adapted for use as a bearing or as an anti-frictional disc where a low coefficient of friction is desired because it has long wearing qualities, it is not fragile, and does not break easily, and because of the graphite content, it is practically self-lubricating, does not chatter or grip when it is run dry, and requires practically no lubrication.

I claim:

1. An intimate mixture of powdered ingredients in substantially the following proportions; a thermosetting, potentially reactive synthetic resin moulding powder of phenol-formaldehyde and fibrous asbestos together in equal amounts by weight 45.4%, lead 27.3%, antimony 9.1%, and flake graphite 18.2%.

2. A low-frictional compound of powdered ingredients united under heat and pressure to form a solid mass consisting of a fibrous asbestos and thermo-setting, potentially reactive phenol-formaldehyde moulding powder, half of each by weight, 45.4%, lead 27.3%, antimony 9.1% and graphite 18.2%.

3. A composition of the ingredients, asbestos, thermo-setting synthetic resin, lead, antimony and graphite, substantially in accordance with the proportions specified in claim 2, the last three named being all of a fineness to pass through a 150 mesh screen, and united to form a solid.

4. A new article of manufacture comprising predetermined proportions of the ingredients substantially as set forth in claim 2, asbestos thermo-setting synthetic resin, lead, antimony and graphite, intimately mixed together, the metallic ingredients and graphite being of a fineness to pass half through a 300 mesh screen and the remainder through a 150 mesh screen, the mixture being solidified by heat and pressure.

5. A low-frictional self-lubricating bearing member comprising thermo-setting synthetic resin, and fibrous asbestos moulding powder, half of each by weight, 45.4%, antimony 9.1%, graphite 18.2%, and at least one metal of the group consisting of lead and copper, totaling 27.3%, all in powdered form and of a fineness to pass through a 150 mesh screen, the ingredients mixed together and subjected to heat and pressure and forming a solid.

CHARLES P. TEEPLE.